(12) United States Patent
Chen et al.

(10) Patent No.: US 10,005,876 B2
(45) Date of Patent: Jun. 26, 2018

(54) POLYURETHANE-BASED BINDER DISPERSION

(71) Applicant: Hewlett-Packard Development Company, L.P., Houston, TX (US)

(72) Inventors: Tienteh Chen, San Diego, CA (US); Bin Huang, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/544,494

(22) PCT Filed: Jan. 30, 2015

(86) PCT No.: PCT/US2015/013701
§ 371 (c)(1),
(2) Date: Jul. 18, 2017

(87) PCT Pub. No.: WO2016/122569
PCT Pub. Date: Aug. 4, 2016

(65) Prior Publication Data
US 2018/0016384 A1   Jan. 18, 2018

(51) Int. Cl.
| | | |
|---|---|---|
| C08G 18/75 | (2006.01) | |
| C08G 18/65 | (2006.01) | |
| C08G 18/62 | (2006.01) | |
| C09D 11/38 | (2014.01) | |
| C08G 18/38 | (2006.01) | |
| C08G 18/34 | (2006.01) | |
| C08G 18/10 | (2006.01) | |
| C09D 11/30 | (2014.01) | |
| C09D 175/04 | (2006.01) | |

(52) U.S. Cl.
CPC .......... *C08G 18/755* (2013.01); *C08G 18/10* (2013.01); *C08G 18/348* (2013.01); *C08G 18/3857* (2013.01); *C08G 18/6225* (2013.01); *C08G 18/6541* (2013.01); *C09D 11/38* (2013.01)

(58) Field of Classification Search
CPC ....... C08G 18/10; C09D 11/38; C09D 175/04
USPC ........................................................ 524/591
See application file for complete search history.

(56) References Cited

U.S. PATENT DOCUMENTS

| | | | |
|---|---|---|---|
| 4,110,284 A | 8/1978 | Violland et al. | |
| 4,204,051 A | 5/1980 | Wellner et al. | |
| 5,277,945 A | 1/1994 | Takoh et al. | |
| 5,384,362 A | 1/1995 | Carlson et al. | |
| 5,512,651 A | 4/1996 | Carlson et al. | |
| 5,548,005 A | 8/1996 | Kurth et al. | |
| 6,136,890 A | 10/2000 | Carlson et al. | |
| 6,455,611 B1 | 9/2002 | Pears et al. | |
| 7,858,676 B2 | 12/2010 | Waki et al. | |
| 8,348,411 B2 | 1/2013 | Brust et al. | |
| 8,492,456 B2 | 7/2013 | Chen et al. | |
| 8,513,334 B2 | 8/2013 | Grablowitz et al. | |
| 8,557,387 B2 | 10/2013 | Kraus et al. | |
| 8,679,243 B2 | 3/2014 | Yokoyama et al. | |
| 2008/0227945 A1 | 9/2008 | Richards et al. | |
| 2009/0018254 A1 | 1/2009 | Huster et al. | |
| 2009/0270581 A1 | 10/2009 | Tielemans et al. | |
| 2013/0085217 A1 | 4/2013 | Iu et al. | |
| 2013/0102729 A1 | 4/2013 | Li et al. | |
| 2013/0266776 A1* | 10/2013 | Matsuoka | C08L 75/14 428/195.1 |
| 2014/0288237 A1 | 9/2014 | Berge et al. | |

FOREIGN PATENT DOCUMENTS

| | | |
|---|---|---|
| CN | 103254867 | 8/2013 |
| CN | 103626953 | 3/2014 |
| CN | 103709363 | 4/2014 |
| EP | 1382622 | 1/2004 |
| EP | 2269719 | 1/2011 |
| EP | 2559740 | 2/2013 |
| WO | WO 2001/074921 | 10/2001 |
| WO | WO 2011/063190 | 5/2011 |
| WO | WO 2012/088122 | 6/2012 |
| WO | WO 2013/037767 | 3/2013 |
| WO | WO 2013/067222 | 5/2013 |
| WO | WO 2013/096344 | 6/2013 |
| WO | WO 2013/165946 | 11/2013 |

OTHER PUBLICATIONS

International Search Report and Written Opinion for International Application No. PCT/US2015/013701 dated Sep. 30, 2015, 9 pages.

* cited by examiner

*Primary Examiner* — Fred M Teskin
(74) *Attorney, Agent, or Firm* — Dierker & Kavanaugh, P.C.

(57) ABSTRACT

A binder dispersion includes water and polyurethane. The polyurethane is formed from polyisocyanate; polyol having two hydroxyl (OH) groups at one chain end, no OH groups at an opposed chain end, and a number average molecular weight ($M_n$) ranging from ~500-~5,000; an alcohol, diol or amine having a $M_n$<500; and one of i) a carboxylic acid; ii) a sulfonate or sulfonic acid having one amino group; iii) i and ii; iv) i and a homopolymer or copolymer of poly (ethylene glycol) (PEG) having one or two OH or amino groups at one chain end; v) ii and a homopolymer or copolymer of PEG having one or two OH or amino groups at one chain end; or vi) i, ii, and a homopolymer or copolymer of PEG having one or two OH or amino groups at one chain end.

15 Claims, No Drawings

POLYURETHANE-BASED BINDER DISPERSION

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

DETAILED DESCRIPTION

In inkjet printing, polyurethane dispersions may be added to inkjet inks to improve the durability of the resulting print. In particular, polyurethanes have been added to improve the scratch and abrasion resistance of the resulting prints. However, it has been found that the amount and type of polyurethane used in the inkjet inks may lead to complications with the jetting performance and reliability (e.g., nozzle health).

These complications may include poor decap performance of the ink (which includes the polyurethane). For example, many inks including more than 1% of a polyurethane binder exhibit poor decap performance. The term "decap performance," as referred to herein, means the ability of the inkjet ink to readily eject from the printhead, upon prolonged exposure to air. The decap time is measured as the amount of time that a printhead may be left uncapped (i.e., exposed to air) before the printer nozzles no longer fire properly, potentially because of clogging, plugging, or retraction of the colorant from the drop forming region of the nozzle/firing chamber. The length of time a thermal inkjet pen can remain unused and uncapped before spitting would be required to form an acceptable quality ink drop is called decap time, or first drop decap time. Another decap metric is the number of spits required to get the pen healthy at a specific time interval. A decreased decap time can lead to poor print reliability. As such, the longest decap time that would give acceptable first drop quality or the fewest number of spits required at any given decap time would be desirable for any given ink.

Examples of the inkjet ink disclosed herein, which include the polyurethane binder dispersion disclosed herein, exhibit several desirable characteristics, one of which is improved decap performance. In particular, when the inkjet ink is printed at intervals with idle and uncapped periods between printing intervals, the number of spits (drops) required to obtain a healthy (i.e., drop weight and location) normal drop on a medium is reduced, e.g., when compared to inks including other types of polyurethane dispersions.

The improved decap performance is believed to be due, at least in part, to the particular polyol used to form the polyurethane binder. The polyol includes two hydroxyl groups at one end of the polymer chain and no hydroxyl groups at the opposed end of the polymer chain. In some examples, this polyol replaces the type of polyol used in typical polyurethanes, which has hydroxyl groups at both ends of the polymer chain. A portion of the polyol disclosed herein becomes pendant to the polyurethane backbone and the polyurethane has a comb like structure after polymerization. The hydroxyl groups may become part of the polyurethane backbone and the remaining portion of the polyol (i.e., the group at the other end of the polyol) becomes the pendant group or pendant branch. This is in contrast to the replaced polyol, which generally incorporates the entire polyol into the backbone of the polymer chain without any portion of the polyol forming a pendant group or pendant chain. In the examples disclosed herein, it has been found that the improved decap performance is obtained, even at high binder loadings, when at least this polyol is used.

The improved decap performance may also be due to the relatively small size of the polyurethane binder. For example, the polyurethane binder may be in the form of particles having an average diameter ranging from about 10 nm to about 200 nm. These small particles can be easily jetted, and thus do not deleteriously affect the nozzle health. Still further, the improved decap performance may be due, at least in part, to other properties of the polyurethane binder dispersion, including the acid number (e.g., the sum of both weak and strong acid groups, with a unit of mg KOH per 1 gram of polymer). These properties may also contribute to the inkjet ink having dispersion stability and the ability to form durable prints. Overall, the inkjet inks including examples of the polyurethane binder dispersion disclosed herein exhibit improved jetting performance and print reliability.

Moreover, the improved decap performance results in the application of an acceptable quality ink drop. In the examples disclosed herein, the quality (i.e., optical density and gloss) of the images may further be improved when the polyurethane binder is formed with a sulfonate or sulfonic acid having one amino functional group and/or with a particular homopolymer or copolymer of poly(ethylene glycol). Still further, improved image quality results when the inkjet ink (including the polyurethane binder dispersion) is coupled with a pre-treatment fixer fluid.

The inkjet ink, which includes the polyurethane binder disclosed herein, may be included in a single cartridge ink set or a multiple-cartridge ink set (which may or may not include the pre-treatment fixer fluid). In the multiple-cartridge ink set, any number of the multiple inks may have the polyurethane binder incorporated therein.

In an example, the inkjet ink disclosed herein includes a co-solvent (in addition to any water that is present), a colorant, a surfactant, the polyurethane binder, and a balance of water (which is the main solvent). In some examples, the inkjet ink composition consists of these components, with no other components. As one example, the inkjet ink may exclude polymers other than the polyurethane binder disclosed herein. In other examples, the inkjet ink composition may include other components, such as a jettability additive, and an anti-kogation agent.

As used herein, "ink vehicle" may refer to the liquid fluid in which the polyurethane binder (e.g., the polyurethane binder dispersion) and the colorant (e.g., a colorant dispersion) are placed to form the ink(s). A wide variety of ink vehicles may be used in the inkjet ink. The ink vehicle may include water alone or in combination with a mixture of a variety of additional components. Examples of these additional components may include the co-solvent(s), the surfactant(s), the anti-kogation agent(s), and/or the jettability additive(s).

The co-solvent(s) may be present in the inkjet ink in an amount ranging from about 0.1 wt % to about 30 wt %, depending, at least in part, on the jetting architecture to be used. In an example, the co-solvent is present in the inkjet ink in an amount of about 10 wt % based on the total wt % of the inkjet ink. It is to be understood that other amounts outside of this example and range may also be used. Classes of co-solvents that may be used include organic co-solvents, such as aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the ink vehicle may include 1-(2-hydroxyethyl)-2-pyrrolidone.

As mentioned above, the ink vehicle of the inkjet ink may also include surfactant(s). As an example, the inkjet ink may include non-ionic, cationic, and/or anionic surfactants, which may be present in an amount ranging from about 0.01 wt % to about 5 wt % based on the total wt % of the inkjet ink. In at least some examples, the ink vehicle may include a silicone-free alkoxylated alcohol surfactant such as, for example, TEGO® Wet 510 (Evonik Tego Chemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylated acetylenic diol), CARBOWET® GA-211 (a.k.a. SURFYNOL® CT-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.).

The ink vehicle of the inkjet ink may include the anti-kogation agent. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODAFOS® O3A or CRODAFOS® N-3 acid from Croda Int.) or dextran 500k. Other suitable examples of the anti-kogation agents include CRODAFOS® HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the inkjet ink in an amount ranging from about 0.05 wt % to about 2 wt % of the total wt % of the ink.

In some examples disclosed herein, the ink vehicle of the inkjet ink may also include antimicrobial agent(s) (biocide(s)), viscosity modifier(s), material(s) for pH adjustment, sequestering agent(s), preservative(s), jettability additive(s) (e.g., liponic ethylene glycol (LEG-1), available from Liponics), and the like.

When a biocide is utilized, a suitable amount of the biocide may range from about 0.05 wt % to about 0.5 wt % of a total wt % of the ink. In examples, the biocide is present at about 0.18 wt %, or at about 0.14 wt % of a total wt % of the ink. It is to be understood that the upper limit for the biocide(s) may depend upon the type of biocide and its toxicological effect and/or regulatory requirements. For example, the upper limit for PROXEL® GXL (Arch Chemicals, Inc., Norwalk, Conn.) is 0.2 wt %. Suitable biocides include, for example, PROXEL® GXL, KORDEK® MLX (The Dow Chemical Co.), and/or BIOBAN® CS-1246 (The Dow Chemical Co.).

The inkjet ink may be any color, such as black, cyan, magenta, yellow, etc. As such, in addition to the ink vehicle, the inkjet ink also includes a colorant. In an example, the colorant is a self-dispersed pigment added to the ink vehicle. In another example, the colorant is a pigment in a dispersion including water, the pigment, and a polymer that disperses the pigment (i.e., the polymer dispersant). In an example, the pigment dispersion may also include, for example, a co-solvent, such as 2-pyrrolidone. The pigment dispersion may be prepared or purchased, and the other components of the ink (e.g., vehicle components and the polyurethane binder dispersion) may be slowly added to the pigment dispersion with continuous mixing, to form the inkjet ink.

As used herein, "pigment" may generally include organic or inorganic pigment colorants, magnetic particles, aluminas, silicas, and/or other ceramics, organo-metallics, metallic particulates, or other opaque particles that introduce color to the ink vehicle. The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof. Any suitable pigment may be used, and while several examples are provided herein, it is to be understood that the list is non-limiting.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Georgia, (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL° series, or the MONARCH® series manufactured by Cabot Corporation, Boston, Massachusetts, (such as, e.g., REGAL® 400R, REGAL® 330R, REGAL® 660R, MOGUL® E, MOGUL® L, AND ELFTEX® 410); and various black pigments manufactured by Evonik Degussa Orion Corporation, Parsippany, New Jersey, (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® R0100, STANDART® R0200, and DORADO® gold-bronze pigments (available from Eckart Effect Pigments, Wesel, Germany).

The total amount of pigment in the inkjet ink ranges from about 1 wt % to about 5 wt % (based on the total wt % of the inkjet ink). The average particle size of the pigments may range anywhere from about 50 nm to about 200 nm. In an example, the average particle size ranges from about 80 nm to about 150 nm.

In the examples disclosed herein, the pigment may be dispersed by an anionic polymer (i.e., anionic polymeric dispersant). The dispersant may be present in an amount ranging from about 0.1 wt % to about 5 wt % of a total wt % of the ink composition.

In an example, the dispersant may be styrene-acrylic-type dispersants such as acrylic dispersants having i) hydrophilic monomers including acidic monomers, and ii) hydrophobic monomers. The acid number of the dispersant may range from about 120 mg/g to about 300 mg/g. It is to be understood that the styrene-acrylic-type dispersants are water soluble.

Acidic monomers that may be used in the acrylic dispersant may include, for example, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof.

Examples of the hydrophobic monomers that can be polymerized in the acrylic dispersant may include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, and combinations thereof.

The inkjet ink also includes the polyurethane binder. In an example, the polyurethane binder is present in the polyurethane binder dispersion with water. The polyurethane/polyurethane binder is present in the ink an amount ranging from greater than 1 wt % to about 20 wt % based upon the total wt % of the inkjet ink. In another example, the amount of polyurethane/polyurethane binder ranges from about 5 wt % to about 20 wt % or from greater than 5 wt % to about 15 wt % based upon the total wt % of the inkjet ink. This weight percentage accounts for the weight percent of active polyurethane/polyurethane binder present in the ink composition, and does not account for the total weight percent of the polyurethane binder dispersion in the inkjet ink. As such, the weight percentages given for the polyurethane/polyurethane binder do not account for any other components (e.g., water) that may be present when the polyurethane is part of the dispersion. The polyurethane binder dispersion may be added with the colorant (e.g., colorant dispersion) and the components of the ink vehicle to form the inkjet ink.

The polyurethane binder dispersion may be formed by synthesizing a polyurethane solution (i.e., the polyurethane polymer in an organic solvent), and then ionizing and dispersing the polyurethane solution in water to form the polyurethane binder dispersion. The resulting polyurethane binder dispersion includes the polyurethane polymer, which is water soluble/dispersible. Each of these steps will be discussed further below.

The polyurethane binder is formed from the following components: (a) a polyisocyanate; (b) a polyol having a chain with two hydroxyl functional groups at one end of the chain and no hydroxyl functional groups at the opposed end of the chain; in some instances, (c) a carboxylic acid-containing ionic acid including at least two hydroxyl functional groups or amino functional groups; in some instances, (d) a homopolymer or copolymer of poly(ethylene glycol) having one or two hydroxyl functional groups or one or two amino functional groups at one end of its chain; in some instances, (e) a sulfonate or sulfonic acid having one amino functional group; and (f) an alcohol, or a diol, or an amine with a number average molecular weight less than 500.

In the examples disclosed herein, the polyurethane may be formed form components (a), (b), (f), and any of i) component (c), ii) component (e), iii) a combination of components (c) and (e), iv) a combination of components (c) and (d), v) a combination of components (d) and (e), or vi) a combination of components (c), (d) and (e).

These components are selected so that the resulting polyurethane binder has an acid number ranging from about 10 mg/g to about 50 mg/g. The combination of these particular components and properties are believed to improve the decap performance and print reliability of the inkjet ink. In addition, the polyurethane dispersion excludes a reactive colorant.

For component (a), any suitable polyisocyanate may be used. For example, a polyisocyanate having an average of two or more isocyanate groups may be used. In an example, the polyisocyanate may be an aliphatic, cycloaliphatic, araliphatic, or aromatic polyisocyanate, as well as products of their oligomers, used alone or in mixtures of two or more. In an example, the polyisocyanate is an aliphatic polyisocyanate or a cycloaliphtic polyisocyanate, either of which has a reduced tendency to yellow. Some example polyisocyanates include hexamethylene-1,6-diisocyanate (HDI), 2,2,4-trimethyl-hexamethylene-diisocyanate (TDMI), 1,12-dodecane diisocyanate, 2,4,4-trimethyl-hexamethylene diisocyanate, 2-methyl-1,5-pentamethylene diisocyanate, isophorone diisocyanate (IPDI), and combinations thereof. The amount of the polyisocyanate within the binder dispersion ranges from about 20 wt % to about 50 wt % of the total wt % of the polyurethane. In an example, polyisocyanate makes up from about 30 wt % to about 50 wt % of the polyurethane binder.

Turning to component (b), the amount of component (b) (i.e., the polyol) within the polyurethane binder dispersion ranges from about 10 wt % to about 70 wt % of the total wt % of the polyurethane. In an example, component (b) (i.e., the polyol) makes up from about 30 wt % to about 60 wt % of the polyurethane binder.

Component (b) is a particular polyol. The term "polyol", as used herein in connection with component (b), means any product having a chain with two hydroxyl groups at one end of the chain and no hydroxyl groups at the opposed end of the chain. The polyol has a number average molecular weight ($M_n$) ranging from about 500 to about 5000. Additionally, the polyol has a glass transition temperature ($T_g$) ranging from about −20° C. to about 100° C. In an example, the glass transition temperature ranges from about 0° C. to about 80° C.

The polyol may be formed from the free radical polymerization of a monomer in the presence of a mercaptan that includes two hydroxyl functional groups or two carboxylic functional groups. The polyol may contribute to the improved decap of the inkjet ink because the hydroxyl groups at one end of the chain of the polyol are incorporated into the polyurethane backbone chain, while the group at the other end of the polyol forms a pendant group or pendant chain depending on what specific polyol is used. The polyol may segregate in the aqueous ink, which renders the polyurethane binder readily dispersible (i.e., more stable) in the ink vehicle. The polyol may also help prevent the polyurethane from swelling.

Some examples of the monomer used to form component (b) include an alkylester of acrylic acid or an alkylester of methacrylic acid, such as methyl (meth)acrylate, ethyl (meth)acrylate, n-butyl (meth)acrylate, tetrahydrofuryl (meth)acrylate, t-butyl (meth)acrylate, 2-ethylhexyl (meth)acrylate, hexyl (meth)acrylate, cyclohexyl (meth)acrylate, phenyl (meth)acrylate, benzyl (meth)acrylate, 2-aziridinylethyl (meth)acrylate, aminomethyl acrylate, aminoethyl acrylate, aminopropyl (meth)acrylate, amino-n-butyl(meth)acrylate, N,N-dimethylaminoethyl(meth)acrylate, N,N-dimethylaminopropyl (meth)acrylate, N,N-diethylaminoethyl (meth)acrylate, and N,N-diethylaminopropyl (meth)acrylate.

Some other examples of the monomer used to form component (b) include an acid group containing monomer, such as acrylic acid, methacrylic acid, carboxyethyl (meth)acrylate, 2-(meth)acryloyl propionic acid, crotonic acid, and itaconic acid. In another example, the monomer used to form component (b) may be an acrylamide, an acrylamide derivative, methacrylamide, or a methacrylamide derivative. Some examples of acrylamide and methacrylamide derivatives include hydroxyethylacrylamide, N,N-methylol(meth)acrylamide, N-butoxymethyl (meth)acrylamide, and N-isobutoxymethyl (meth)acrylamide.

Some further examples of the monomer used to form component (b) may be styrene or a styrene derivative. Some examples of styrene derivatives include alpha-methyl styrene, p-aminostyrene, and 2-vinylpyridine. Additionally, the monomer used to form component (b) may be acrylonitrile, vinylidene chloride, a fluorine containing acrylate, a fluorine containing methacrylate, a siloxane containing acrylate, a siloxane containing methacrylate, vinyl acetate, or N-vinylpyrrolidone. Some specific examples include 2,2,2-Trifluoroethyl acrylate, 1H,1H,3H-Hexafluorobutyl acrylate, 1H,1H,3H-Tetrafluoropropyl methacrylate, 1H,1H,5H-Octafluoropentyl methacrylate, 1H,1H,5H-Octafluoropentyl acrylate, poly(dimethylsiloxane), METHACRYLOXY-PROPYL TERMINATED® DMS-R11 (made by Gelest Chemicals), and ACRYLOXY TERMINATED® DMS-U21 (made by Gelest Chemicals). It is to be understood that any combination of monomers listed for component (b) may be used.

Some examples of the mercaptan used to form component (b) include 1,2-propanediol (thioglycerol), 1-mercapto-1,1-ethanediol, 2-mercapto-1,3-propanediol, 2-mercapto-2-methyl-1,3-propanediol, 2-mercapto-2-ethyl-1,3-propanediol, 1-mercapto-2,3-propanediol, 2-mercaptoethyl-2-methyl-1,3-propanediol, and thioglycolic acid.

In one example, component (b) may be formed by preparing a solution of the monomer and mercaptan in an organic solvent. When a combination of two monomers is used, the two monomers may be present in a ratio ranging from about 1:1 to about 9:1. In an example, methyl methacrylate and 2-ethylhexyl acrylate are used in a combination of 9:1 respectively. When a combination of three monomers is used, the three monomers may be present in a ratio ranging from about 5:4:1 to about 10:8:3. In an example, methyl methacrylate, 2-ethylhexyl acrylate, and methacrylic acid are used in a combination of 10:8:3 respectively. Examples of other suitable monomer combinations used in forming component (b) may be found in Table 1 of the Examples section.

After the solution (including the monomer and the mercaptan) is prepared, the solution is placed in an inert environment. For example, a flow of nitrogen gas may be introduced through the solution to create the inert environment. The solution may then be heated to a suitable temperature for polymerization, and the reaction may be allowed to occur for a suitable time. The time and temperature for polymerization will depend upon the monomer(s) and mercaptan(s) used. In an example, the polymerization temperature is about 50° C. to about 90° C., and the reaction is allowed to occur for about 6 hours. In another example, the polymerization temperature is about 70° C.

The polyol formed may include the mercaptan ranging from about 2 wt % to about 10 wt % based on the total wt % of the polyol. In an example, the mercaptan may make up about 5 wt % of the total wt % of the polyol.

In some instances, component (c) may also be used to form the polyurethane. Component (c) is a carboxylic acid. The amount of component (c) within the binder dispersion ranges from 0 wt % to about 10 wt % based upon the total wt % of the polyurethane. In an example, component (c) makes up from about 2 wt % to about 6 wt % of the polyurethane binder.

The presence of component (c) assists in the ability of the polyurethane to be dissolved or dispersed in water after ionization with a base. As previously stated, component (c) is a carboxylic acid. In some instances, component (c) includes two or more hydroxyl groups. Component (c) may have a number average molecular weight ($M_n$) of about 500. Examples of component (c) may be derived from hydroxycarboxylic acids having the general formula $(HO)_xQ(COOH)_y$, where Q is a straight or branched hydrocarbon radical containing 1 to 12 carbon atoms, and x is 2 or 3 and y ranges from 1 to 3. Examples of suitable hydroxycarboxylic acids include dimethylol propionic acid (DMPA), dimethylol butanoic acid (DMBA), alanine, citric acid, tartaric acid, glycolic acid, lactic acid, malic acid, dihydroxymaleic acid, dihydroxytartaric acid, or mixtures thereof.

With respect to component (d), in some examples, component (d) is a homopolymer or copolymer of poly(ethylene glycol) (i.e., poly(ethylene oxide) having one hydroxyl functional group or one amino functional group. In other examples, component (d) may be a homopolymer or copolymer of poly(ethylene glycol) (i.e., poly(ethylene oxide) having two hydroxyl functional groups or two amino functional groups at one end of its chain. The homopolymer or copolymer of poly(ethylene glycol) has a number average molecular weight ($M_n$) ranging from about 500 to about 5,000. In another example, the homopolymer or copolymer of poly(ethylene glycol) has a number average molecular weight ($M_n$) ranging from about 500 to about 3,000. Component (d) also has a water solubility of greater than 30% v/v (volume of poly(ethylene glycol) to volume of water).

Examples of the polyurethane dispersion disclosed herein including component (d) increase the gloss and optical density of a printed image on media when compared to the gloss and optical density of a printed image on the same media formed with an ink that includes other types of polyurethane dispersions that do not include component (d). This may be due, in part, because, when included, component (d) prevents the polyurethane binder from reacting with an underlying pre-treatment fixing fluid, which would otherwise cause the polyurethane binder to undesirably coagulate when the ink composition is applied to the medium. As such, component (d) renders the polyurethane binder insensitive to the pre-treatment fixing fluid, and thus prevents undesirable polyurethane coagulation. Since the polyurethane binder does not strongly interact with the pre-treatment fixing fluid to cause coagulation, the polyurethane can form a film when printed, which advantageously affects the gloss and optical density of the printed image.

The amount of component (d) in the polyurethane binder dispersion ranges from 0 wt % to about 20 wt % based upon the total wt % of the polyurethane. In an example, component (d) is from about 5 wt % to about 15 wt % of the polyurethane binder.

Any copolymer of poly(ethylene glycol) with one hydroxyl or amino group may be used as component (d), as long as the copolymer has water solubility of >30% v/v and a suitable number average molecular weight. Some examples of suitable copolymers for component (d) include a copolymer of poly(ethylene) and poly(ethylene glycol) with one hydroxyl functional group (e.g.,

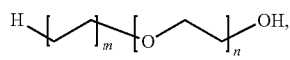

where m=1-10 and n=5-50, a copolymer of poly(propylene glycol) and poly(ethylene glycol) with one hydroxyl functional group, and a copolymer of poly(ethylene glycol) and poly(propylene glycol) with one amino functional group. Some commercially available examples of the copolymer of poly(ethylene glycol) and poly(propylene glycol) with one amino functional group include JEFFAMINE® M-1000 (i.e.,

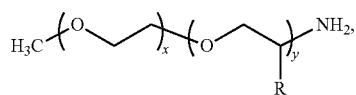

where x=19 and y=3) and JEFFAMINE® M-2070 (i.e.,

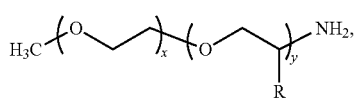

where x=31 and y=10) (both produced by Huntsman Chemicals).

Some additional examples of component (d) include a poly(ethylene glycol) homopolymer, such as monoamine terminated poly(ethylene glycol) (i.e.,

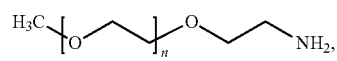

where n=5-100, and a poly(ethylene glycol) mono alkyl ether. Examples of the poly(ethylene glycol) mono alkyl ether include an alkyl group with C1 to C8 straight or branched hydrocarbons, such as methyl, ethyl, and butyl groups. Examples of the poly(ethylene glycol) mono alkyl ether include poly(ethylene glycol) monomethyl ether (i.e.,

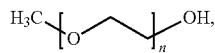

where n=5-100, poly(ethylene glycol) monoethyl ether, poly(ethylene glycol) monopropyl ether, and poly(ethylene glycol) monobutyl ether.

Furthermore, any homopolymer of poly(ethylene glycol) with two hydroxyl or amino groups at one end of the polymer chain may alternatively be used as component (d), as long as the homopolymer has water solubility of >30% v/v and a suitable number average molecular weight. As an example, the homopolymer may be two hydroxyl terminated poly(ethylene glycol), where both hydroxyls are located at one end of the chain. One commercially available example is YMER™ N120 (a linear difunctional polyethylene glycol monomethyl ether from Perstorp).

Turning now to component (e), component (e) is a sulfonate or sulfonic acid having one amino functional group. The polyurethane dispersion disclosed herein, which may include component (e), improves the decap performance and print reliability of the inkjet ink including the dispersion, without sacrificing (and in some instances improving) image quality. Component (e) may be present in an amount ranging from 0 wt % to 20 wt % based upon the total wt % of the polyurethane. In an example, component (e) is present in an amount ranging from about 2 wt % to about 20 wt % of the polyurethane binder. In another example, component (e) may be present in an amount of about 5 wt % to about 15 wt % of the polyurethane binder.

Some examples of component (e) include taurine

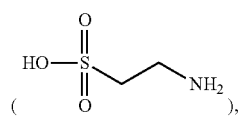

4-Aminotoluene-3-sulfonic acid

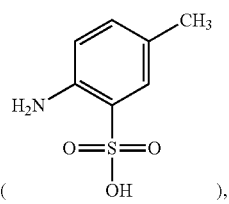

Aniline-2-sulfonic acid

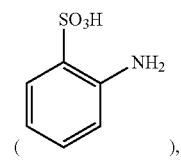

Sulfanilic acid

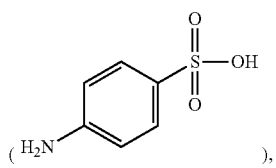 [SMILES: Nc1ccc(S(=O)(=O)O)cc1]

4-Amino-1-naphthalenesulfonic acid

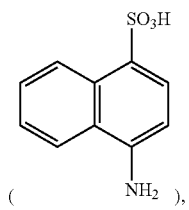

3-Amino-4-hydroxybenzenesulfonic acid

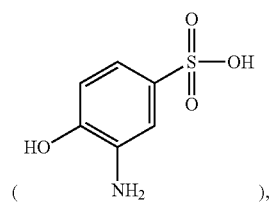 [SMILES: Nc1cc(S(=O)(=O)O)ccc1O]

2-Amino-1-naphthalenesulfonic acid

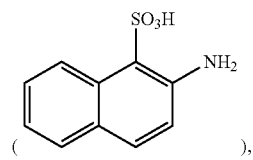

5-Amino-2-methoxybenzenesulfonic acid

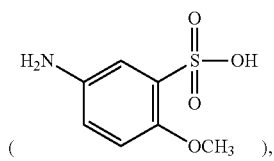

2-(Cyclohexylamino)ethanesulfonic acid

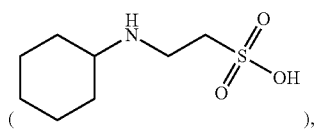 [SMILES: O=S(=O)(O)CCNC1CCCCC1]

and 3-Amino-1-propanesulfonic acid

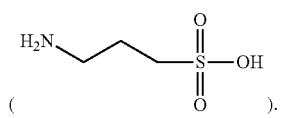

It is to be understood that in some examples, component (e) has, at most, one hydroxyl functional group in addition to the sulfonate or sulfonic acid. Moreover, component (e) does not function as a chain extender of the polyurethane.

The polyurethane binder dispersion further includes component (f). Component (f) includes an alcohol, or a diol, or an amine. The alcohol or diol or amine has a number average molecular weight ($M_n$) of less than 500. In an example, component (f) may be present in an amount ranging from greater than 0 wt % to about 20 wt % based on the total wt % of the polyurethane. In another example, component (f) may be present in an amount ranging from greater than 0 wt % to about 15 wt %.

Some examples of the alcohol or diol include methanol, ethanol, 1-butanol, propanol, 1,2-propanediol, 1,4-butanediol, 1,5-pentanediol, 1,6-hexanediol, neopentyl glycol, 1,4-cyclohexanediol, cyclohexane-1,4-dimethanol, ethylene glycol, diethylene glycol, triethylene glycol, Bisphenol A, Bisphenol A ethoxylate (BPAE, $M_n$=492), Bisphenol A (2,3-dihydroxypropyl) glycidyl ether, Bisphenol A bis(3-chloro-2-hydroxypropyl) ether, Bisphenol A bis(2,3-dihydroxypropyl) ether, Bisphenol A propoxylate, and 4,4'-Sulfonyldiphenol. Examples of the amine include n-butylamine and ethylene diamine.

In an example of the first step of the method for making the polyurethane binder dispersion, components (a) and (b), in some instances (c), and (f) are mixed in a reactor with the organic solvent (e.g., methyl ethyl ketone (MEK), tetrahydrofuran (THF), ethyl acetate, acetone, or combinations thereof) and a catalyst (e.g., dibutyl tin dilaurate, bismuth octanoate, and 1,4-diazabicyclo[2.2.2]octane). The reactor may be maintained at a constant temperature and under a dry air mixture. The components may be mixed and the polymerization reaction may be allowed to occur until the % NCO reaches the theoretical value. In an example, the reaction time ranges from about 1 hour to about 4 hours. In another example, the polymerization reaction occurs for about 3 hours at 60° C. to achieve the theoretical value of the % NCO.

In an example of the second step of the method for making the polyurethane polymer, component (d) is then added to the polymerization reaction of components (a) and (b), and in some instances (c), and (f). Polymerization is continued until the % NCO reaches the theoretical value. In this step, the polymerization reaction may be allowed to occur for a time ranging from about 1 hour to about 4 hours. In an example, the polymerization reaction occurs for 4 hours at 60° C. to achieve the theoretical value of the % NCO. In examples in which component (d) is not included, this step may skipped and the method may continue as described below.

In an example of the third step of the method for making the polyurethane polymer, component (e) is dissolved in one equivalent of a base and a sufficient amount of deionized water to fully dissolve component (e). Some examples of the base include ammonia, trimethylamine, triethylamine, sodium hydroxide, potassium hydroxide, and lithium hydroxide. The polymer solution made from components (a) and (b), and in some instances (c), (d) and/or (f) is cooled to a temperature ranging from about 30° C. to about 50° C. The aqueous solution of component (e) is added to the polymer solution from the first step (if component (d) is not included) or the second step (if component (d) is included) with vigorous mixing at a temperature ranging from about 30° C. to about 50° C. for at least 30 minutes. In examples in which component (e) is not included, this step may skipped and the method may continue as described below.

In an example of the fourth step of the method for making the polyurethane polymer, the polyurethane solution may be added to water including a base slowly (e.g., over a 10 minute period) with vigorous agitation or vice versa. The mixture may be stirred and organic solvent may be removed by distillation to form the polyurethane binder dispersion. In an example, the acid number of the polyurethane binder dispersion ranges from about 10 mg KOH/g solid resin to about 50 mg KOH/g solid resin, or from about 15 mg KOH/g solid resin to less than 45 mg KOH/g solid resin, or from about 10 mg KOH/g solid resin to less than 35 mg KOH/g solid resin.

Once the polyurethane binder dispersion is prepared, the particle size of the polyurethane binder in the dispersion ranges from about 10 nm to about 200 nm. In an example, the particle size of the polyurethane binder ranges from about 10 nm to about 100 nm.

After the ink is prepared, the ink(s) may be applied to a medium using any inkjet printer (e.g., thermal, piezoelectric, etc.). In an example, the ink(s) may be applied to a coated offset medium. A coated offset medium is any paper coated to impart better image quality by providing some degree of surface gloss, smoothness, and reduced ink absorbency. Examples of commercially available coated offset media include STERLING® Ultra Gloss (NewPage Corp.) and UTOPIA® (Appleton Coated LLC). In other examples, the medium may be coated or uncoated paper. The medium may also be a vinyl or plastic material.

The inkjet ink may be paired with a pre-treatment fixing fluid in an inkjet ink set. In some instances, a pre-treatment fixing fluid may be applied to the medium prior to printing the inkjet ink onto the medium. The pre-treatment fixing fluid is described in greater detail below.

The pre-treatment fixing fluid may be suitable for wet-on-wet printing on the coated offset media. The pre-treatment fixing fluid includes a particular combination of salts (at a desirably low content), a particular co-solvent, and a low HLB (hydrophilic-lipophilic balance) surfactant that is capable of dynamically lowering the surface tension of the pre-treatment fluid. In the examples disclosed herein, the HLB is less than 10. The selected salt(s), solvent, and surfactant together may advantageously promote dot gain and reduce feathering and pigment flotation, resulting in higher quality text prints. The composition of the pre-treatment fixing fluid disclosed herein also exhibits desirable pen reliability.

As mentioned above, the pre-treatment fixing fluid disclosed herein includes calcium propionate, calcium pantothenate, tetraethylene glycol, a low HLB surfactant, an acid, and a balance of water. In some examples, the pre-treatment fixing fluid consists of these components alone, and in other examples, the pre-treatment fixing fluid includes these components and an anti-microbial agent.

The combination of calcium propionate and calcium pantothenate provides the pre-treatment fixing fluid with metal salts that may cause the pigment or colorant in the ink deposited thereon to coagulate, and that may control pigment migration/flotation etc. The calcium propionate may be present in an amount ranging from greater than 4.5 wt % to about 8.0 wt % based on the total wt % of the pre-treatment fluid. The calcium pantothenate may be present in an amount ranging from about 2.0 wt % to 15 wt % or less. In an example, the pre-treatment fixing fluid may include about 6.5 wt % of calcium propionate and about 4.8 wt % of calcium pantothenate. The amount of the metal salts is believed to be high enough to achieve the desired fixing effect without deleteriously affecting pen reliability.

The pre-treatment fixing fluid also includes tetraethylene glycol as a co-solvent. The tetraethylene glycol may be present in total in the pre-treatment fixing fluid in a range from about 0.1 wt % to about 30 wt %. The amount used may depend, at least in part, on the jetting architecture used to apply the pre-treatment fixing fluid. In an example, the amount of tetraethylene glycol used is about 12 wt %.

The pre-treatment fixing fluid also includes the low HLB surfactant. This type of surfactant is capable of dynamically controlling, in particular, lowering, the surface tension of the pre-treatment fixing fluid. The low HLB surfactant may provide the pre-treatment fluid, at the time of its application, with a surface tension that is lower than the surface energy of the coated offset medium upon which the pre-treatment fixing fluid is being applied. As such, the contact angle between the pre-treatment fixing fluid and the medium is zero (0), which enables the pre-treatment fixing fluid to spread out across the medium surface in a horizontal direction (with respect to the medium surface), and effectively wet and reduce the surface energy of the offset coated medium.

Examples of the low HLB surfactant are a self-emulsifiable wetting agent based on acetylenic diol chemistry (e.g., SURFYNOL® SE-F) or a non-ionic, alkylphenylethoxylate and solvent free surfactant (e.g., CARBOWET® GA-211 surfactant, a.k.a. SURFYNOL® CT-211, from Air Products and Chemicals, Inc.). The low HLB surfactant is present in the pre-treatment fixing fluid in an amount ranging from about 0.01 wt % to about 1.0 wt % based on the total wt % of the pre-treatment fixing fluid. In an example, the amount of the surfactant is about 0.05 wt %. It is believed that the desired surface tension may not be obtainable with other amounts and/or other surfactants.

In some examples, the pre-treatment fixing fluid may also include an antimicrobial agent. Antimicrobial agent(s), such as biocides and fungicides, may be added to inhibit the growth of harmful microorganisms. Example antimicrobial agents may include the NUOSEPT® (Ashland Inc.), UCARCIDE® or KORDEK® (Dow Chemical Co.), and PROXEL® (Arch Chemicals) series, and combinations thereof. A total amount of the antimicrobial agents in the pre-treatment fixing fluid may range from about 0.05 wt % to about 1 wt %. In an example, the pre-treatment fixing fluid includes about 0.1 wt % of a biocide.

The balance of the pre-treatment fixing fluid is water. In addition, buffer(s) may be used to adjust the pH of the pre-treatment fixing fluid to a particular pH. One example of a suitable buffer is methanesulfonic acid. In some examples, the buffer may be used in an amount sufficient to buffer the pH of the pre-treatment fixing fluid so that it ranges from 4.0 to 7.0. In an example, the pH of the pre-treatment fixing fluid is adjusted to about 6.6 using methanesulfonic acid.

As described above, the surface tension of the pre-treatment fixing fluid is lower than the surface energy of the offset coated medium so that when the pre-treatment fixing fluid is applied on the surface of the offset coated medium, the contact angle between the pre-treatment fixing fluid and the offset coated medium is 0. In an example, the surface tension of the pre-treatment fixing fluid is below 37 dyne/cm. In another example, the surface tension of the pre-treatment fixing fluid ranges from about 30 dyne/cm to about 33 dyne/cm. In still another example, the surface energy of the coated offset medium ranges from about 34 dyne/cm to about 42 dyne/cm, and the surface tension of the pre-treatment fixing fluid is about 33 dyne/cm or lower.

The pre-treatment fixing fluid may be applied onto the medium using any suitable high speed (e.g., from about 50 fpm to about 1000 fpm) inkjet printing apparatus, including thermal inkjet printers or web presses, piezoelectric inkjet printers or web presses, continuous inkjet printers or web presses.

In an example, the amount of pre-treatment fixing fluid that is applied to the medium ranges from about 1 gsm to about 7 gsm.

In the examples disclosed herein, no drying operation is performed after the pre-treatment fixing fluid is applied on the medium. Rather, while the pre-treatment fixing fluid is wet, the inkjet ink disclosed herein is deposited on the pre-treatment fixing fluid on the medium. When multiple ink colors are used, it is to be understood that all of the inks are applied while previously deposited layers are still wet. The ink(s) is also formulated to be deposited by the inkjet printing system.

The salts present in the pre-treatment fixing fluid instantaneously react with the colorant present in the ink, causing the pigment to crash out of ink and fixing the pigment on the medium surface. In addition, the applied pre-treatment fixing fluid provides the coated offset medium with a reduced surface energy, which causes the deposited ink(s) to spread less than if the surface energy were higher. This contributes to bleed control and dot gain, and thus enhances the print quality attributes. This benefit is in addition to the benefits obtained from the instantaneous fixing of the colorant(s) in the ink by the salts in the pre-treatment fixing fluid.

To further illustrate the present disclosure, examples are given herein. It is to be understood that these examples are provided for illustrative purposes and are not to be construed as limiting the scope of the present disclosure.

EXAMPLES

Example 1

Several examples of the polyurethane binder dispersion disclosed herein and several comparative polyurethane dispersion examples were prepared. Several examples of the polyol having two hydroxyl groups at one end of the polymer chain were also prepared for use in the example polyurethane binder dispersions. The compositions of the particular polyol used to form the example polyurethane dispersions are shown in Table 1, with the wt % of each component that was used. The compositions of the example and comparative example polyurethane dispersions are shown in Table 2, with the wt % of each component that was used. Several properties of the resulting polyurethane binder dispersions are also provided in Table 2.

One of the example polyols, referred to herein as Polyol-2, was synthesized as follows:

300 g of methyl methacrylate (MMA), 300 g of n-butyl acrylate (BA), 60 g of thioglycerol, 6 g of azobisisobutylonitrile (AIBN), and 400 g of acetone were mixed in a beaker until the solution became homogeneous. The solution was purged with nitrogen for 20 minutes. A 2-liter four neck round bottom flask equipped with a mechanical stirrer, a condenser and a nitrogen inlet was immersed in a constant temperature water bath. The solution containing the monomers (MMA and BA), mercaptan (i.e., thioglycerol), and 2-2'-Azoisobutyronitrile (AIBN) was pumped into the reactor (i.e., the flask) for about two hours. The polymerization continued for about four more hours after the addition of the solution. A viscous polymer solution was obtained. The number average molecular weight ($M_n$) was 1800. The weight average molecular weight ($M_w$) was calculated to be 2400 using Gel Permeation Chromatography. The % solid was 78%.

Each of the other example polyols was prepared in a similar manner as described for polyol-2, using the components and amounts set forth in Table 1.

The following abbreviations are used in Table 1: MMA (methyl methacrylate), BA (butyl acrylate), EHA (2-ethylhexylacrylate), MAA (methacrylic acid), TBA (t-butyl acrylate), TBMA (t-butyl methacrylate), BzMA (benzyl methacrylate), VA (vinylacetate), CHMA (cyclohexyl methacrylate), and THFM (tetrahydrofuran methacrylate).

TABLE 1

| Polyol | Monomers | Ratio of Monomers | Thioglycerol (wt % of polyol) |
| --- | --- | --- | --- |
| Polyol-2 | MMA/BA | 50/50 | 10% |
| Polyol-7 | MMA/EHA | 75/25 | 5% |
| Polyol-8 | MMA/EHA | 50/50 | 5% |
| Polyol-9 | MMA/EHA | 90/10 | 5% |
| Polyol-10 | MMA/EHA/MAA | 50/40/10 | 5% |
| Polyol-12 | MMA/EHA | 50/50 | 10% |
| Polyol-13 | MMA/EHA/MAA | 50/40/15 | 5% |
| Polyol-14 | MMA/TBA | 50/50 | 5% |
| Polyol-15 | TBMA/EHA | 50/50 | 5% |

TABLE 1-continued

| Polyol | Monomers | Ratio of Monomers | Thioglycerol (wt % of polyol) |
| --- | --- | --- | --- |
| Polyol-16 | BzMA/EHA | 50/50 | 5% |
| Polyol-17 | Styrene/BA | 50/50 | 5% |
| Polyol-18 | VA/BA | 50/50 | 5% |
| Polyol-19 | CHMA/BA | 50/50 | 5% |
| Polyol-20 | THFM/BA | 50/50 | 5% |

Polyol-2 and polyol-8 were then used in the synthesis of the example polyurethane dispersions. Each of the examples shown in Table 1 may be used to form examples of the polyurethane binder and dispersions disclosed herein. The example and comparative example polyurethane dispersions are discussed in greater detail below.

One of the example polyurethane binder dispersions, referred to herein as PUG-1 was synthesized as follows:

(Part 1) 61.1 g of Polyol-02, 7.89 g of DMPA, 34.9 g of IPDI, and 41 ml of acetone were mixed in a 500 ml of 4-neck round bottom flask. A mechanical stirrer and condenser were attached. The flask was immersed in a constant temperature bath at about 70° C. The system was kept under dry air blanket. 3 drops of dibutyl tin dilaurate (DBTDL) was added to initiate the polymerization. Polymerization was continued for 2 hours at about 70° C. 0.5 g samples were withdrawn for % NCO titration. The % NCO was 5.2%.

(Part 2) 7.75 g of 1-butanol was added to the reactor and the polymerization was continued three more hours at about 70° C. 0.5 g of prepolymer was withdrawn for final % NCO titration. The % NCO was 0.2%.

(Part 3) The prepolymer solution was dispersed into 385 g of deionized water and 7.33 g of 45% potassium hydroxide with good agitation to form the polyurethane dispersion (PUG-1). PUG-1 was filtered through 400 mesh stainless sieve. Acetone was removed with a Rotorvap at 55° C.

The particle size was measured using a Malvern Zetasizer, and the average radius was 30 nm. The pH was 8.1. The %solid was 25.0%.

Each of the other example and comparative example polyurethane dispersions were prepared in a similar manner to PUG-1, using the components and amounts set forth in Table 2. The examples of component (b) used to form the comparative example polyurethane dispersions had the hydroxyl groups at opposed ends of the backbone chain.

The following abbreviations are used in Table 2: AN (acid number), IPDI (Isophorone diisocyanate), PTMG1K (Poly (tetrahydrofuran, $M_n$ of 1000), PPG1K (Poly(propyleneglycol), $M_n$ of 1000), C-1090 (poly)carbonate) polyol, $M_n$ of 1000), DMPA (2,2'-Dimethylol Propionic Acid), M-2070 (JEFFAMINE® M-2070 from Huntsman Chemical), BOH (Butanol), and BPAE (Bisphenol A ethoxylate). Each of PTMG1K, PPG1K and C-1090 is a polyol with hydroxyl groups at both ends of the polymer chain.

TABLE 2

| | | | Component | | | | | |
| --- | --- | --- | --- | --- | --- | --- | --- | --- |
| | | | B | | | | | |
| | | A | | % | C | D | E | F |
| | AN | IPDI | Polyol | Polyol | DMPA | M-2070 | Taurine | BOH | BPAE |
| PUD-1* | 55.6 | 35.2 | PTMG1K | 51.5 | 13.30 | None | None | None | None |
| PUD-12* | 55.1 | 43.6 | C-1090 | 43.2 | 13.20 | None | None | None | None |
| PUD-24* | 55.1 | 43.6 | PPG1K | 43.2 | 13.20 | None | None | None | None |

TABLE 2-continued

| | A | B | | C | D | E | F | |
|---|---|---|---|---|---|---|---|---|
| | AN | IPDI | Polyol | % Polyol | DMPA | M-2070 | Taurine | BOH | BPAE |
| PUD-29* | 40.4 | 29.9 | PTMG1K | 60.4 | 9.66 | None | None | None | None |
| PUG-1 | 33.0 | 34.8 | Polyol-2 | 49.5 | 7.90 | None | None | 7.75 | None |
| PUG-3 | 29.3 | 30.9 | Polyol-2 | 44 | 7.00 | 11.6 | None | 6.45 | None |
| PUG-4 | 32.4 | 28 | Polyol-2 | 51.1 | 7.74 | 10.5 | None | 2.72 | None |
| PUG-43 | 35.6 | 21.1 | Polyol-8 | 51.4 | None | None | 7.93 | None | 19.5 |
| PUG-44 | 32.1 | 30.5 | Polyol-8 | 49.4 | 7.66 | None | None | 6.78 | 5.62 |
| PUG-45 | 29.8 | 25.7 | Polyol-8 | 52.1 | 7.11 | 9.64 | None | 5.36 | None |
| PUG-46 | 31.8 | 21.6 | Polyol-8 | 52.6 | 2.17 | 4.86 | 5.07 | 1.68 | 12.0 |

*Comparative Polyurethane Binder

Prophetic Example 2

Example and comparative ink compositions are prepared with a black pigment or a cyan pigment (each of which is present in a dispersion with water) and with the example and comparative polyurethane binder dispersions listed in Table 2 of Example 1. The general formulation of the example and comparative ink compositions including the black pigment is shown in Table 3. The general formulation of the example and comparative ink compositions including the cyan pigment is shown in Table 4. It is to be understood that each ink includes a different one of the polyurethane binder dispersions listed in Table 2. The example and comparative inks are prepared by adding the respective binder dispersion and the black pigment dispersion or the cyan pigment dispersion to the remaining ink components shown in Tables 3 and 4.

TABLE 3

| Ingredient | Specific component | wt % active |
|---|---|---|
| Polyurethane dispersion | polyurethane binder dispersion of TABLE 2 | 5.00 |
| Co-solvent | 1-(2-hydroxyethyl)-2-pyrrolidone | 10.00 |
| Anti-Kogation agent | CRODAFOS ® N3A | 0.50 |
| Surfactant | CARBOWET ® GA-211 (formerly known as SURFYNOL ® CT-211) | 0.80 |
| Additive | LEG-1 | 1.00 |
| Colorant | Black pigment | 2.75 |
| Water | | Balance |

TABLE 4

| Ingredient | Specific component | wt % active |
|---|---|---|
| Polyurethane dispersion | polyurethane binder dispersion of TABLE 2 | 5.00 |
| Co-solvent | 1-(2-hydroxyethyl)-2-pyrrolidone | 10.00 |
| Anti-Kogation agent | CRODAFOS ® N3A | 0.50 |
| Surfactant | CARBOWET ® GA-211 (formerly known as SURFYNOL ® CT-211) | 0.80 |
| Additive | LEG-1 | 1.00 |

TABLE 4-continued

| Ingredient | Specific component | wt % active |
|---|---|---|
| Colorant | Cyan pigment | 2.50 |
| Water | | Balance |

A pre-treatment fixer fluid is also prepared. The composition of the pre-treatment fixing fluid is shown below in Table 5.

TABLE 5

| Compositional Components | wt % |
|---|---|
| Calcium Propionate | 6.5 |
| Calcium Pantothenate | 4.8 |
| Tetraethylene Glycol | 12 |
| CARBOWET ® GA-211 (formerly known as SURFYNOL ® CT-211) | 0.1 |
| Biocide | 0.1 |
| Methanesulfonic acid | Used to Adjust pH to 6.6 |
| Water | Balance |

After each example and comparative ink composition is prepared, the decap is tested for each ink composition. Decap testing is performed on a testbed that includes print cartridge electronics to print thermal inkjet pens with a nominal drop weight of 6 ng. These pens are printed on a standard office paper media loaded on a rotating drum (30 inches per second) with a pen frequency of 12 KHz and pen temp of 55° C. Pens are printed at discreet and increasing time intervals of up to 10 seconds. Between each print time interval, the pen is kept idle and uncapped. Decap at 1 second is reported as # of spits (drops) required to attain a healthy (drop wt and location) normal drop on the medium. The anticipated results are shown below in Table 6. The anticipated decap results are shown for the black inks and comparative inks as well as the cyan inks and comparative inks, but the inks are identified in Table 6 according to the polyurethane dispersion in the ink or comparative ink.

TABLE 6

Polyurethane Dispersion in Ink or Comparative Ink

| | Anticipated # spits to recover nozzle health (Black Inks and Black Comparative Inks) | Anticipated # spits to recover nozzle health (Cyan Inks and Cyan Comparative Inks) |
|---|---|---|
| PUD-1* | >50 | >50 |
| PUD-12* | >50 | >50 |
| PUD-24* | >50 | >50 |
| PUD-29* | >50 | >50 |
| PUG-1 | 6 | 6 |
| PUG-44 | 5 | 6 |
| PUG-3 | 8 | 8 |
| PUG-4 | 10 | 9 |
| PUG-43 | 6 | 6 |
| PUG-45 | 10 | 9 |
| PUG-46 | 8 | 8 |

*Comparative Polyurethane Binder

As shown in Table 6, the black and cyan comparative example ink compositions have a significantly larger anticipated number of spits to recover the nozzle health when compared to the black and cyan example ink compositions.

In general, during printing idle time, water evaporation from ink at the print head opening leads to significant viscosity increase close to the print head nozzles, which can form a viscous plug that prevents or interferes with the jetting of subsequent ink drops. The polyurethane binder disclosed herein (including component b) contributes to the ink having a lower viscosity build up. As such, the ink is prevented from becoming too viscous near the nozzles between the uncapped time intervals, thereby preventing clogging of the pen opening. As such, decap is improved and the print cartridge requires fewer drops to attain a normal, accurate drop on the medium. Specifically, these anticipated results indicate that component (b) (i.e., the polyol with two hydroxyl groups on one end of the polyol chain and no hydroxyl groups at the opposed end of the chain) unexpectedly contributes to the ink having a lower viscosity build up, and can significantly improve decap when compared to a polyol with a hydroxyl group on each end of the polyol.

In addition, prints are formed using the black and cyan example inks (i.e., the black and cyan inks including PUG-1, PUG-44, PUG-3, PUG-4, PUG-43, PUG45 and PUG-46) and the black and cyan comparative example inks (i.e., the black and cyan inks including PUD-1, PUD-12, PUD-24 and PUD-29). These prints are formed by first printing the pre-treatment fixing fluid (2.5 g/m² or gsm) onto STERLING® Ultra Gloss (NewPage Corp.) media. Each example and comparative ink composition are then printed onto the media containing the pre-treatment fixing fluid in an amount of about 10 gsm. The prints are dried.

Optical density (OD) and 75° gloss measurements are taken of the printed images. The optical density (OD) measurements are taken using an X-rite eXact™ densitometer and 75° gloss measurements are taken using a BYK-Gardner MICRO-GLOSS® 75° Meter (BYK-Gardner USA). The anticipated results of the optical density (OD) and 75° gloss measurements are shown below in Table 7. The anticipated print quality results are shown for the black example and comparative example inks and the cyan example and comparative example inks, but the inks are identified in Table 7 according to the polyurethane dispersion in the ink.

TABLE 7

Polyurethane Dispersion

| | Black Ink | | Cyan Ink | |
|---|---|---|---|---|
| | Anticipated OD | Anticipated 75° gloss | Anticipated OD | Anticipated 75° gloss |
| PUD-1* | 1.02 | 58.5 | 1.01 | 56.9 |
| PUD-12* | 1.02 | 59.0 | 1.03 | 57.1 |
| PUD-24* | 1.04 | 58.7 | 1.01 | 56.7 |
| PUD-29* | 1.01 | 58.9 | 1.02 | 56.6 |
| PUG-1 | 1.06 | 59.7 | 1.07 | 57.1 |
| PUG-44 | 1.1 | 60.6 | 1.02 | 57.2 |
| PUG-3 | 1.18 | 66.7 | 1.18 | 62 |
| PUG-4 | 1.21 | 67.1 | 1.26 | 64.7 |
| PUG-43 | 1.25 | 69.0 | 1.29 | 68.8 |
| PUG-45 | 1.30 | 69.3 | 1.30 | 68.9 |
| PUG-46 | 1.43 | 74.6 | 1.40 | 72.5 |

*Comparative Polyurethane Binder

As shown in Table 7, the example black and cyan inks formed with the polyurethane dispersions including component (b), but without component (d) and/or component (e) (e.g., PUG-1 and PUG-44) are expected to have slightly better or the same optical density and gloss when compared to the comparative example black and cyan inks. Also as shown in Table 7, the example black and cyan inks formed with the polyurethane dispersions including component (b) as well as component (d) and/or component (e) (e.g., PUG-3, PUG-4, PUG-43, PUG-45, and PUG-46) are expected to have improved optical density and gloss when compared to the comparative example black and cyan inks. The additional homopolymer or copolymer of poly(ethylene glycol) having one hydroxyl functional group or one amino functional group (i.e., component d) and/or the sulfonate or sulfonic acid having one amino functional group (i.e., component e) are expected to improve the compatibility of the ink with the pre-treatment fixing fluid, and thus improve the film formation on the medium. As a result, these example polyurethane dispersions are also expected to improve the printing performance. As such, in addition to improving decap performance of inks, some examples of the polyurethane binder dispersion disclosed herein may also improve print quality attributes.

It is to be understood that the ranges provided herein include the stated range and any value or sub-range within the stated range. For example, a range from about 1 wt % to about 20 wt % should be interpreted to include not only the explicitly recited limits of about 1 wt % to about 10 wt %, but also to include individual values, such as 1.5 wt %, 10 wt %, 12.5 wt %, 15 wt %, etc., and sub-ranges, such as from about 12 wt % to about 18 wt %, from about 5 wt % to about 7 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A polyurethane-based binder dispersion, comprising:
water; and
a polyurethane dispersed in the water, the polyurethane having been formed from:
a polyisocyanate;
a polyol having a chain with two hydroxyl functional groups at one end of the chain and no hydroxyl groups at an opposed end of the chain, and having a number average molecular weight ranging from about 500 to about 5,000;
an alcohol or a diol or an amine having a number average molecular weight less than 500; and one of
i) a carboxylic acid;
ii) a sulfonate or sulfonic acid having one amino functional group;
iii) a combination of i and ii;
iv) a combination of i and a homopolymer or copolymer of poly(ethylene glycol) having one or two hydroxyl functional groups or one or two amino functional groups at one end of its chain;
v) a combination of ii and a homopolymer or copolymer of poly(ethylene glycol) having one or two hydroxyl functional groups or one or two amino functional groups at one end of its chain; or
vi) a combination of i, ii, and a homopolymer or copolymer of poly(ethylene glycol) having one or two hydroxyl functional groups or one or two amino functional groups at one end of its chain.

2. The polyurethane-based binder dispersion as defined in claim 1 wherein the sulfonate or sulfonic acid having the one amino functional group has, at most, one hydroxyl functional group in addition to the sulfonate or sulfonic acid.

3. The polyurethane-based binder dispersion as defined in claim 2 wherein the sulfonate or sulfonic acid is selected from the group consisting of taurine, 4-Aminotoluene-3-sulfonic acid, Aniline-2-sulfonic acid, Sulfanilic acid, 4-Amino-1-naphthalenesulfonic acid, 3-Amino-4-hydroxybenzenesulfonic acid, 2-Amino-1-naphthalenesulfonic acid, 5-Amino-2-methoxybenzenesulfonic acid, 2-(Cyclohexylamino)ethanesulfonic acid, and 3-Amino-1-propanesulfonic acid.

4. The polyurethane-based binder dispersion as defined in claim 1 wherein:
the polyol is formed from a free radical polymerization of a monomer in the presence of a mercaptan including two hydroxyl functional groups or two carboxylic functional groups;
the monomer is selected from the group consisting of an alkylester of acrylic acid, an alkylester of methacrylic acid, an acid group containing monomer, acrylamide, an acrylamide derivative, methacrylamide, a methacrylamide derivative, styrene, a styrene derivative, acrylonitrile, vinylidene chloride, a fluorine containing acrylate, a fluorine containing methacrylate, a siloxane containing acrylate, a siloxane containing methacrylate, vinyl acetate, N-vinylpyrrolidone, and combinations thereof; and
the mercaptan is selected from the group consisting of 1,2-propanediol (thioglycerol), 1-mercapto-1,1-ethanediol, 2-mercapto-1,3-propanediol, 2-mercapto-2-methyl-1,3-propanediol, 2-mercapto-2-ethyl-1,3-propanediol, 1-mercapto-2,3-propanediol, 2-mercaptoethyl-2-methyl-1,3-propanediol, and thioglycolic acid.

5. The polyurethane-based binder dispersion as defined in claim 4 wherein:
the alkylester of acrylic acid or the alkylester of methacrylic acid is selected from the group consisting of methyl (meth)acrylate, ethyl (meth)acrylate, n-butyl (meth)acrylate, tetrahydrofuryl (meth)acrylate, t-butyl (meth)acrylate, 2-ethylhexyl (meth)acrylate, hexyl (meth)acrylate, cyclohexyl (meth)acrylate, phenyl (meth)acrylate, benzyl (meth)acrylate, 2-aziridinylethyl (meth)acrylate, aminomethyl acrylate, aminoethyl acrylate, aminopropyl (meth)acrylate, amino-n-butyl(meth)acrylate, N,N-dimethylaminoethyl(meth)acrylate, N,N-dimethylaminopropyl (meth)acrylate, N,N-diethylaminoethyl (meth)acrylate, and N,N-diethylaminopropyl (meth)acrylate; or
the acid group containing monomer is selected from the group consisting of acrylic acid, methacrylic acid, carboxyethyl (meth)acrylate, 2-(meth)acryloyl propionic acid, crotonic acid, and itaconic acid; or
the acrylamide derivative or the methacrylamide derivative is selected from the group consisting of hydroxyethylacrylamide, N,N-methylol(meth)acrylamide, N-butoxymethyl (meth)acrylamide, and N-isobutoxymethyl (meth)acrylamide; or
the styrene derivative is selected from the group consisting of alpha-methyl styrene, p-aminostyrene, and 2-vinylpyridine.

6. The polyurethane-based binder dispersion as defined in claim 4 wherein one of:
the monomer includes methyl methacrylate and butyl acrylate in a ratio of 1:1 and the mercaptan includes 10 wt % thioglycerol;
the monomer includes methyl methacrylate and 2-ethylhexyl acrylate in a ratio of 3:1 and the mercaptan includes 5 wt % thioglycerol;
the monomer includes methyl methacrylate and 2-ethylhexyl acrylate in a ratio of 1:1 and the mercaptan includes 5 wt % thioglycerol;
the monomer includes methyl methacrylate and 2-ethylhexyl acrylate in a ratio of 9:1 and the mercaptan includes 5 wt % thioglycerol;
the monomer includes methyl methacrylate, 2-ethylhexyl acrylate, and methacrylic acid in a ratio of 5:4:1 and the mercaptan includes 5 wt % thioglycerol;
the monomer includes methyl methacrylate and 2-ethylhexyl acrylate in a ratio of 1:1 and the mercaptan includes 10 wt % thioglycerol;
the monomer includes methyl methacrylate, 2-ethylhexyl acrylate, and methacrylic acid in a ratio of 10:8:3 and the mercaptan includes 5 wt % thioglycerol;
the monomer includes methyl methacrylate and t-butyl acrylate in a ratio of 1:1 and the mercaptan includes 5 wt % thioglycerol;
the monomer includes t-butyl methacrylate and 2-ethylhexyl acrylate in a ratio of 1:1 and the mercaptan includes 5 wt % thioglycerol;
the monomer includes benzyl (meth)acrylate and 2-ethylhexyl acrylate in a ratio of 1:1 and the mercaptan includes 5 wt % thioglycerol;
the monomer includes styrene and butyl acrylate in a ratio of 1:1 and the mercaptan includes 5 wt % thioglycerol;
the monomer includes vinyl acetate and butyl acrylate in a ratio of 1:1 and the mercaptan includes 5 wt % thioglycerol;

the monomer includes cyclohexyl methacrylate and butyl acrylate in a ratio of 1:1 and the mercaptan includes 5 wt % thioglycerol; or the monomer includes tetrahydrofuryl methacrylate and butyl acrylate in a ratio of 1:1 and the mercaptan includes 5 wt % thioglycerol.

7. The polyurethane-based binder dispersion as defined in claim 1 wherein the polyurethane is formed from one of iv, v, or vi, and wherein the homopolymer or copolymer of poly(ethylene glycol) having one or two hydroxyl functional groups or one or two amino functional groups at one end of its chain is present in an amount ranging from greater than 5 wt % to about 20 wt % based on a total wt % of the polyurethane.

8. The polyurethane-based binder dispersion as defined in claim 7 wherein the homopolymer or copolymer of poly(ethylene glycol) has a number average molecular weight ($M_n$) ranging from about 500 to about 5000 and a water solubility greater than 30% v/v, and wherein the homopolymer or copolymer of poly(ethylene glycol) is one of:
a poly(ethylene glycol) copolymer selected from the group consisting of a copolymer of poly(ethylene) and poly(ethylene glycol) with the one hydroxyl functional group, a copolymer of poly(propylene glycol) and poly(ethylene glycol) with the one hydroxyl functional group, and a copolymer of poly(ethylene glycol) and poly(propylene glycol) with the one amino functional group; or
a poly(ethylene glycol) homopolymer selected from the group consisting of monoamine terminated poly(ethylene glycol), poly(ethylene glycol) monoethyl ether, poly(ethylene glycol) monopropyl ether, poly(ethylene glycol) monobutyl ether, poly(ethylene glycol) monomethyl ether, and two hydroxyl terminated at one end poly(ethylene glycol).

9. The polyurethane-based binder dispersion as defined in claim 1 wherein:
the polyisocyanate is present in an amount ranging from about 20 wt % to about 50 wt % based on a total wt % of the polyurethane;
the polyol having the chain with two hydroxyl functional groups at the one end of the chain and no hydroxyl groups at the opposed end of the chain is present in an amount ranging from about 10 wt % to about 70 wt % based on the total wt % of the polyurethane;
the alcohol or diol or amine having the number average molecular weight less than 500 is present in an amount ranging from greater than 0 wt % to about 20 wt %; and when included:
the carboxylic acid is present in an amount ranging from greater than 0 wt % to about 10 wt %;
the sulfonate or sulfonic acid is present in an amount ranging from greater than 2 wt % to about 20 wt % based on the total wt % of the polyurethane; and
the homopolymer or copolymer of poly(ethylene glycol) is present in an amount ranging from greater than 5 wt % to about 20 wt % based on the total wt % of the polyurethane.

10. The polyurethane-based binder dispersion as defined in claim 1 wherein the alcohol or the diol or the amine having the number average molecular weight less than 500 is the alcohol selected from the group consisting of 1,4-butanediol, 1,6-hexanediol, 1,4-cyclohexanediol, cyclohexane-1,4-dimethanol, Bisphenol A ethoxylate, and Bisphenol A propoxylate.

11. An inkjet ink, comprising:
water;
a colorant;
a co-solvent;
a surfactant; and
a polyurethane binder, the polyurethane binder having been formed from:
a polyisocyanate;
a polyol having a chain with two hydroxyl functional groups at one end of the chain and no hydroxyl groups at an opposed end of the chain and having a number average molecular weight ranging from about 500 to about 5,000;
an alcohol or a diol or an amine having a number average molecular weight less than 500; and one of
i) a carboxylic acid;
ii) a sulfonate or sulfonic acid having one amino functional group;
iii) a combination of i and ii;
iv) a combination of i and a homopolymer or copolymer of poly(ethylene glycol) having one or two hydroxyl functional groups or one or two amino functional groups at one end of its chain;
v) a combination of ii and a homopolymer or copolymer of poly(ethylene glycol) having one or two hydroxyl functional groups or one or two amino functional groups at one end of its chain; or
vi) a combination of i, ii, and a homopolymer or copolymer of poly(ethylene glycol) having one or two hydroxyl functional groups or one or two amino functional group at one end of its chain.

12. The inkjet ink as defined in claim 11 wherein the sulfonate or sulfonic acid having the one amino functional group has, at most, one hydroxyl functional group in addition to the sulfonate or sulfonic acid.

13. The inkjet ink as defined in claim 12 wherein the sulfonate or sulfonic acid is selected from the group consisting of taurine, 4-Aminotoluene-3-sulfonic acid, Aniline-2-sulfonic acid, Sulfanilic acid, 4-Amino-1-naphthalenesulfonic acid, 3-Amino-4-hydroxybenzenesulfonic acid, 2-Amino-1-naphthalenesulfonic acid, 5-Amino-2-methoxybenzenesulfonic acid, 2-(Cyclohexylamino)ethanesulfonic acid, and 3-Amino-1-propanesulfonic acid.

14. The inkjet ink as defined in claim 11 wherein:
the polyol is formed from a free radical polymerization of a monomer in the presence of a mercaptan including two hydroxyl functional groups or two carboxylic functional groups;
the monomer is selected from the group consisting of an alkylester of acrylic acid, an alkylester of methacrylic acid, an acid group containing monomer, acrylamide, an acrylamide derivative, methacrylamide, a methacrylamide derivative, styrene, a styrene derivative, acrylonitrile, vinylidene chloride, a fluorine containing acrylate, a fluorine containing methacrylate, a siloxane containing acrylate, a siloxane containing methacrylate, vinyl acetate, N-vinylpyrrolidone, and combinations thereof; and
the mercaptan is selected from the group consisting of 1,2-propanediol (thioglycerol), 1-mercapto-1,1-ethanediol, 2-mercapto-1,3-propanediol, 2-mercapto-2-methyl-1,3-propanediol, 2-mercapto-2-ethyl-1,3-propanediol, 1-mercapto-2,3-propanediol, 2-mercaptoethyl-2-methyl-1,3-propanediol, and thioglycolic acid.

15. An inkjet ink set, comprising:
a pre-treatment fixing fluid, including:
  calcium propionate present in an amount ranging from greater than 4.5 to about 8.0 wt % based on a total wt % of the pre-treatment fixing fluid;
  calcium pantothenate present in an amount ranging from about 2.0 wt % to equal to or less than 15 wt % based on the total wt % of the pre-treatment fixing fluid;
  tetraethylene glycol;
  a surfactant;
  an acid present in an amount sufficient to render a pH of the pre-treatment fixing fluid from about 4.0 to about 7.0; and
  a balance of water; and
an inkjet ink, including:
  water;
  a colorant;
  a co-solvent;
  a surfactant; and
  a polyurethane binder, the polyurethane binder having been formed from:
    a polyisocyanate;
    a polyol having a chain with two hydroxyl functional groups at one end of the chain and no hydroxyl groups at an opposed end of the chain and having a number average molecular weight ranging from about 500 to about 5,000;
    an alcohol or a diol or an amine having a number average molecular weight less than 500; and one of
    i) a carboxylic acid;
    ii) a sulfonate or sulfonic acid having one amino functional group;
    iii) a combination of i and ii;
    iv) a combination of i and a homopolymer or copolymer of poly(ethylene glycol) having one or two hydroxyl functional groups or one or two amino functional groups at one end of its chain;
    v) a combination of ii and a homopolymer or copolymer of poly(ethylene glycol) having one or two hydroxyl functional groups or one or two amino functional groups at one end of its chain; or
    vi) a combination of i, ii, and a homopolymer or copolymer of poly(ethylene glycol) having one or two hydroxyl functional groups or one or two amino functional groups at one end of its chain.

* * * * *